(12) United States Patent
Kumagai (10) Patent No.: US 7,099,554 B2
(45) Date of Patent: Aug. 29, 2006

(54) LIGHT-GUIDE PLATE, SURFACE LIGHT EMITTING DEVICE USING LIGHT-GUIDE PLATE AND METHOD OF MANUFACTURING LIGHT-GUIDE PLATE

(75) Inventor: Takchiko Kumagai, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/070,152

(22) Filed: Mar. 3, 2005

(65) Prior Publication Data

US 2005/0196123 A1 Sep. 8, 2005

(30) Foreign Application Priority Data

Mar. 4, 2004 (JP) ............................ P2004-060674

(51) Int. Cl.
*G02B 6/10* (2006.01)
(52) U.S. Cl. ...................... 385/146; 362/615; 362/330
(58) Field of Classification Search ...................... None
See application file for complete search history.

(56) References Cited

U.S. PATENT DOCUMENTS 5,506,924 A * 4/1996 Inoue .......................... 385/129

6,328,453 B1   12/2001   Ohkawa
2004/0246697 A1 * 12/2004   Yamashita et al. ............ 362/31

FOREIGN PATENT DOCUMENTS

| JP | 10-253960 | 9/1998 |
| JP | 10-268138 | 10/1998 |
| JP | 2003-86012 | 3/2003 |

* cited by examiner

*Primary Examiner*—Sung Pak
(74) *Attorney, Agent, or Firm*—McGinn IP Law Group, PLLC (57) ABSTRACT

At the time of forming irregularities on at least one of a reflection face and an emitting face of a light-guide plate, irregularities are formed as a plurality of linear grooves formed in a direction perpendicular to the entrance face. When the grooves are formed by means of grinding, surfaces of the grooves are made rough. Therefore, light can be appropriately condensed and diffused by the grooves, and the luminance can be enhanced and the unevenness of the luminance can be reduced.

18 Claims, 7 Drawing Sheets

LIGHT-GUIDE PLATE, SURFACE LIGHT EMITTING DEVICE USING LIGHT-GUIDE PLATE AND METHOD OF MANUFACTURING LIGHT-GUIDE PLATE

BACKGROUND OF THE INVENTION

The present invention is a technique relating to a surface light emitting device used for a liquid crystal display and others.

As a device for illuminating a liquid crystal display board and others, a surface light emitting device referred to as a front light or back light has been proposed. In the surface light emitting device, a point light source or a line light source is arranged on the side of a light-guide plate, a beam of light emitted by the light source enters into the light-guide plate and reflected, and the beam of light emits upward or downward with respect to the light-guide plate. In order to realize the emitting of light described above, irregularities for reflecting light sent from the light source are formed on a predetermined face of the light-guide plate or on an optical sheet laminated on the light-guide plate. Concerning the forms of providing these irregularities, various forms are proposed so as to enhance the luminance and reduce the unevenness of the luminance.

The forms of these irregularities are divided into two main forms. One is a form in which the irregularities are made into points of various shapes such as a column, circular cone and hemisphere, and the other is a form in which the irregularities are made into various linear shapes, the cross sections of which are formed into a triangle and others. In the former form in which the irregularities are made into points of various shapes, the diffusion of light tends to be facilitated, and the unevenness of luminance tends to be reduced. However, the luminance tends to be deteriorated. On the other hand, in the latter form in which the irregularities are made into various linear shapes, the luminance tends to be enhanced, however, the unevenness of luminance tends to be generated along the lines.

As a specific example of the related art, for example, Patent Document 1 discloses a technique in which a projecting portion having a pair of inclined faces formed In a direction perpendicular to an entrance face is repeatedly formed in a direction perpendicular to the entrance face on a reflection face opposed to an emitting face. Patent Document 2 discloses a technique in which the same projecting portions are provided on the emitting face.

Patent Document 1: JP-A-10-268138

Patent Document 2; JP-A-2003-86012

In the case where a surface light emitting device is incorporated into a small device such as a cellular phone, a sufficiently large space can not be provide for arranging the light source. Therefore, a point light source such as LED is preferably adopted, compared with a line light source such as a cold cathode ray tube. However, in the structure disclosed in Patent Documents 1 and 2, the following problems may be encountered. Although the emitting efficiency is high, in the case of using a point light source, a front portion of the light source with respect to a direction perpendicular to the entrance face becomes bright linearly, and further unevenness of the luminance tends to be caused in the vicinity of the light source on the emitting face.

SUMMARY OF THE INVENTION

Accordingly, it is an object of the present invention to enhance luminance and reduce unevenness of luminance even when a point light source such as LED is used.

(1) A light-guide plate comprising:
a light guiding body, which includes:
an entrance face into which light enters;
an emitting face from which the light emits; and
a reflection face which reflects the entered light, and Is opposed to the emitting face,
wherein a plurality of grooves are formed on at least one of the emitting face and the reflection face, and are extended in a direction perpendicular to the entrance face; and
wherein the grooves have rough surfaces, respectively.

(2) The light-guide plate according to (1),
wherein each width of the grooves is defined as $w1$;
wherein each depth of the grooves is defined as $d$;
wherein the rough surfaces include a plurality of projections;
wherein each width of the projections is defined as $w2$; and
wherein each height of the projections is defined as $h$, following equations are satisfied, $$0.05 \text{ mm} < w1 < 0.2 \text{ mm};$$

$$0.002 \text{ mm} < d < 0.02 \text{ mm};$$

$$w2 \leq 0.5 \times w1; \text{ and}$$

$$h \leq 0.5 \times d.$$

(3) The light-guide plate according to (2), following equations are satisfied, $$0.0001 \text{ mm} < w2; \text{ and}$$

$$0.0001 \text{ mm} < h.$$

(4) The light-guide plate according to (1), wherein the grooves are arranged at substantially regular intervals to each other.

(5) A surface light emitting device comprising:
a light source which emits light;
a light guiding body, which includes:
an entrance face into which the light enters;
an emitting face from which the light emits; and
a reflection face which reflects the entered light, and is opposed to the emitting face,
wherein a plurality of grooves are formed on at least one of the emitting face and the reflection face, and are extended in a direction perpendicular to the entrance face; and
wherein the first grooves have rough surfaces, respectively.

(6) The surface light emitting device according to (5), further comprising:
a reflection member that covers the light guiding body so as to expose the entrance face and the emitting face.

(7) The surface light emitting device according to (5), further comprising:
an optical sheet that has translucency, and is provided on the emitting face,
wherein a plurality of second grooves are formed on the optical sheet, and are arranged in a direction parallel to the entrance face.

(8) The surface light emitting device according to (7), wherein width and pitch of the second grooves are respectively larger than those of the first grooves.
(9) The surface light emitting device according to (7), wherein a cross-sectional face of each of the second grooves has triangular shape.
(10) A method of forming a light-guide plate, the method comprising:
providing a light guiding body; and
forming a plurality of linear grooves on at least one of faces of the light guiding body so that the grooves have rough surfaces, respectively,
wherein the faces serve as an emitting face from which light emits and a reflection face which reflects the light, the reflection face being opposed to the emitting face.
(11) The method of forming the light-guide plate according to (10), wherein the grooves are extended in a direction perpendicular to a face of the light guiding body that serves as an entrance face into which the light enters.
(12) The method of forming the light-guide plate according to (10), wherein the grooves are arranged at substantially regular intervals to each other.
(13) The method of forming the light-guide plate according to (10), wherein the grooves are formed by a grinding process.
(14) The method of forming the light-guide plate according to (13), wherein the grinding process is executed by a grindstone wheel having a rough face on a periphery thereof.
(15) The method of forming the light-guide plate according to (14), wherein grind grains are attached to the periphery of the grindstone wheel.

On this light-guide plate, the luminance can be enhanced by the linear grooves. Further, the unevenness of luminance can be reduced when light is diffused by making the surfaces of the grooves rough. Therefore, even if a point light source such as LED is used, it is possible to enhance the luminance and reduce the unevenness of luminance. Since the groves are provided in a direction perpendicular to the entrance face of the light-guide plate, the propagation of light inside the light-guide plate can be enhanced even in a portion distant from the light source.

In this surface light emitting device, luminance can be enhanced by the linear grooves formed on the light-guide plate. On the other hand, when the surfaces of the grooves are made rough, light can be diffused, and unevenness of the luminance can be reduced. Therefore, even if a point light source such as LED is used, it is possible to enhance the luminance and reduce the unevenness of the luminance. Since the grooves are provided in a direction perpendicular to the entrance face of the light-guide plate, the propagation of light inside the light-guide plate can be enhanced even in a portion distant from the light source.

On the light-guide plate manufactured by this manufacturing method, since linear grooves are formed by means of grinding, the surfaces of the grooves are made rough. Therefore, the luminance can be enhanced by the linear grooves. On the other hand, the unevenness of luminance can be reduced when light is diffused by making the surfaces of the grooves rough. Therefore, even if a point light source such as LED is used, it is possible to enhance the luminance and reduce the unevenness of the luminance.

As described above, according to the present invention, even when a point light source such as LED is used, it is possible to enhance the luminance and reduce the unevenness of the luminance.

BRIEF DESCRIPTION OF THE DRAWING

FIG. 3 is a partially enlarged view showing a surface state of the emitting face 22, wherein FIG. 3(a) is a view showing a surface state in the sectional direction of the groove 22a, and FIG. 3(b) is a view showing a surface state in the direction of the groove 22a.

DETAIL DESCRIPTION OF PREFERRED EMBODIMENT

Figure 1:
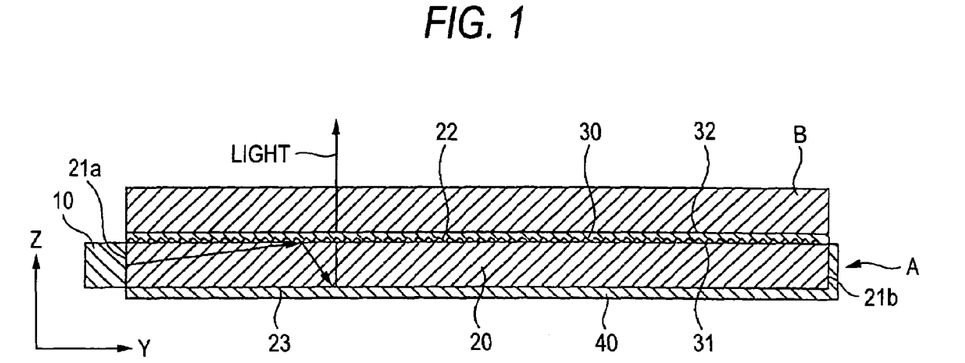
FIG. 1 is a sectional structural view showing an example in which a surface light emitting device A related to one embodiment of the present invention is applied to a liquid crystal display.
Figure 2:
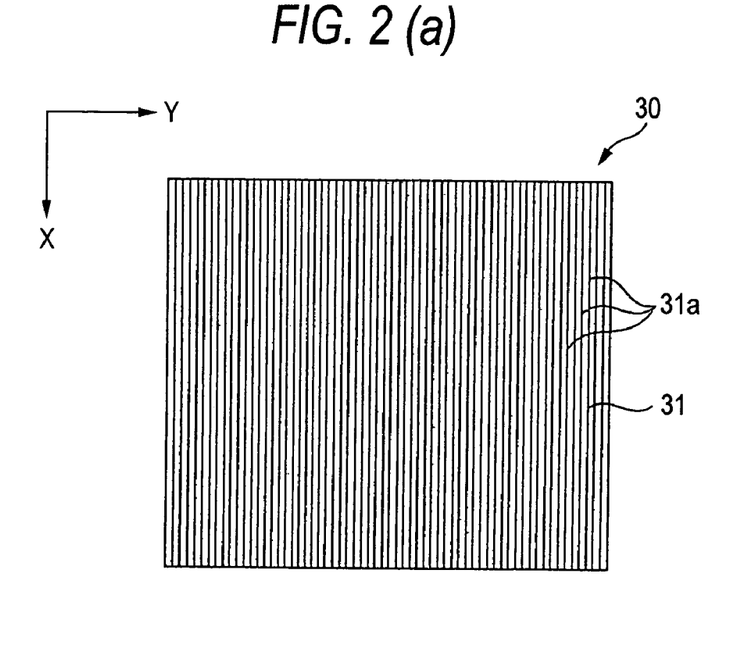
FIG. 2(a) is a lower face view of the optical sheet 30.
FIG. 2(b) is an upper face view of the light source 10 and the light-guide plate 20.

Referring to the accompanying drawings, the most preferred embodiment of the present invention will be explained below. FIG. 1 is a sectional structural view showing an example in which a surface light emitting device A relating to one embodiment of the present invention is applied to a liquid crystal display. This liquid crystal display is of the back light type in which liquid crystal panel B is provided on an upper face side of the surface light emitting device A and liquid crystal panel B is illuminated when surface light emitting device A emits light upward. In this embodiment, this back light type liquid crystal display is taken up as an example so as to make explanations. However, the present invention can be also applied to a front light type liquid crystal display. The surface light emitting device A includes a plurality of light sources 10, a light-guide plate 20, an optical sheet 30 and a reflecting frame 40. Referring to FIGS. 1 and 2, the structure of the surface light emitting device A will be explained as follows. FIG. 2(a) is a lower face view of the optical sheet 30, and FIG. 2(b) is an upper face view of the light source 10 and the light-guide plate 20.

The light source 10 is a point light source such as LED. In this embodiment, even when the point light source described above is adopted as a light source, the luminance can be enhanced and the unevenness of luminance can be reduced, however, it should be noted that a line light source such as a cold cathode ray tube can be adopted. The light-guide plate 20 is a plate-shaped member made of synthetic resin which is a material having translucency such as acrylic resin or polycarbonate. In this embodiment, the light-guide plate 20 is formed into a shape of a rectangular parallelepiped and includes: four sides 21a to 21d; an emitting face 22 from which light that enters into the light-guide plate 20 emits to liquid crystal panel B; and a reflection face 23 opposed to the emitting face 22. The side 21a, which is one of the four sides 21a to 21d, composes an entrance face into which light that is sent from the light source 10 enters. The side 21b composes a face that is opposed to the entrance face 21a and into which light reflected by the reflecting frame 40 enters again. Irregularities described later are formed on the emitting face 22. The reflection face 23 composes a face into which light reflected by the reflecting frame 40 enters again.

The optical sheet 30 is composed of a sheet having translucency and includes a lower face 31 on the emitting face of the light-guide plate 20 and an upper face 32 opposed to the lower face 31. On the lower face 31, the irregularities described later are formed. The reflecting frame 40 is composed so that It can cover the light-guide plate 20 except for the side 21a and the emitting face 22. An inner face of the reflecting frame 40 is formed as a mirror face on which light emitted from the light-guide plate 20 is reflected to enter into the light-guide plate 20 again.

Explanations for the basic principle of surface light emission which is conducted in the surface light emitting device A composed as above go as follow. The arrow shown in FIG. 1 represents an example of the light passage. Light emitted by the light source 10 enters into the light-guide plate 20 through the side 21a. Then, while the light is being reflected on the emitting face 22 and the reflection face 23, it is propagated through the light-guide plate 20. The light directed in the direction of the normal line of the emitting face 22 is emitted from the emitting face 22 and passes through the optical sheet 30, so that liquid crystal panel B can be illuminated by the light.

Figure 3:
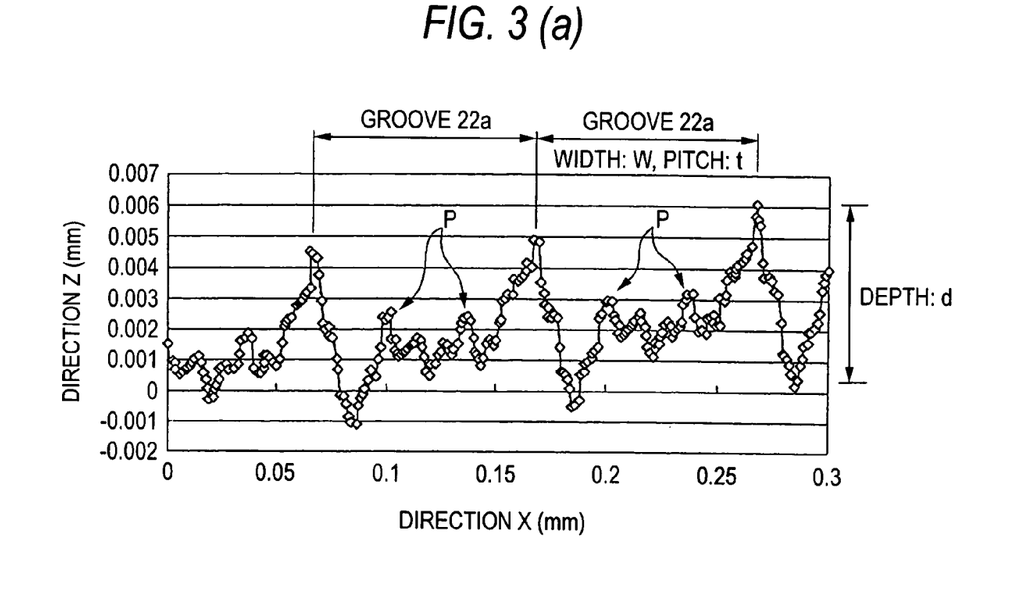

Next, explanations for the form of irregularities provided on the emitting face 22 of the light-guide plate 20 go as follow. Referring to this embodiment, the irregularities are provided only on the emitting face 22, however, the irregularities may be provided on the reflection face 23. Alternatively, the irregularities may be provided on both the emitting face 22 and the reflection face 23. This case of forming the irregularities on both faces is the most effective way to enhance the luminance and reduce the unevenness of the luminance. Referring to FIG. 2(b), on the emitting face 22 of the light-guide plate 20, a plurality of linear fine grooves 22a, which are formed in a direction (direction Y in the drawing) perpendicular to the side 21a of the entrance face, are provided in parallel with each other at substantially regular intervals. Due to the foregoing, the irregularities are formed on the emitting face 22. In this connection, for the convenience of explanations, in FIG. 2(b), the grooves 22a are drawn larger than the actual size being exaggerated Further, in this embodiment, surfaces of these grooves 22a are made rough, that is, finer irregularities are formed. FIGS. 3(a) and 3(b) are partially enlarged views showing a surface condition on the emitting face 22. FIG. 3(a) is view showing a surface condition in the direction of the cross section of the groove 22a, and FIG. 3(b) is view showing a surface condition in the direction along the groove 22a (the direction parallel to the sides 21c and 21d, that is, the direction Y).

As shown in the drawing, on the emitting face 22, the fine groove 22a, the width of which is about 0.1 mm, extended along in the direction Y, is repeatedly provided in the direction X. These fine grooves 22a compose irregularities on the emitting face 22 (referred to as the first irregularities). On the other hand, on the surface of the groove 22a, a plurality of projections P are formed being made rough, so that the second irregularities, which are finer than the first irregularities, can be formed. These projections P are not formed linearly like the grooves 22a but formed at random.

Figure 4:
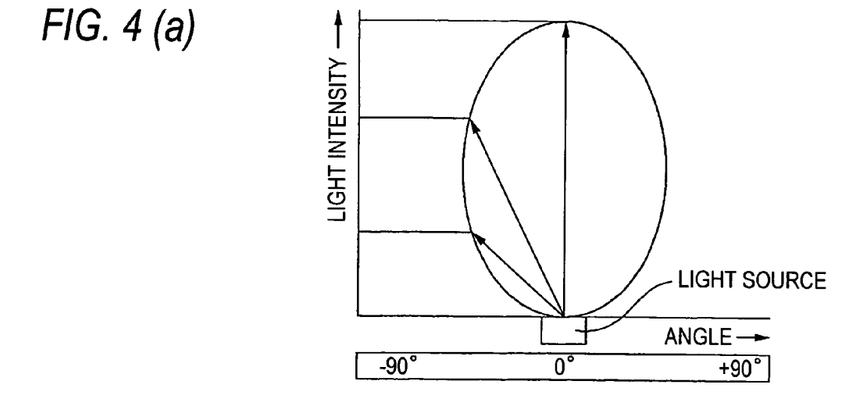
FIG. 4(a) is a view showing a relation between the light intensity of a point light source and the direction (angle) of light.
FIG. 4(b) is a view showing an intensity of light, which is sent from the point light source, inside the light-guide plate.

Advantages of providing the above irregularities will be explained now. First, in general, in the case where a point light source such as LED is adopted as a light source, the directivity with respect to light exists as shown in FIG. 4(a). Therefore, the light intensity differs according to the angle. Further, In the case where light enters into a light-guide plate from a point light source, light is refracted with respect to the entrance of an angle not more than the critical angle. Therefore, as shown in FIG. 4(b), a difference in the light intensity is made with respect to the angle viewed from the point light source on the light-guide plate. The light Intensity is the highest in the direction 0° when it is viewed from the light source, and the light intensity is decreased according to an increase in the angle. In the case where a point light source is adopted as a light source, usually, a plurality of point light sources are used. Therefore, as shown in FIG. 4(b), the region 100, which is located in the straight line direction when the view is taken from the light source, is the brightest. In this region, the light intensity is the highest. Therefore, linear bright lines are generated in this region. The region 101, into which light enters by a predetermined angle, is the second brightest, and the region 102, which is located between the point light sources, is the darkest. A difference in brightness in each region causes unevenness of the luminance.

Therefore, according to the present embodiment, when the first irregularities are formed on the emitting face 22 by the grooves 22a described before, the light condensing effect is enhanced, so that the luminance can be enhanced. On the other hand, when the surfaces of the grooves 22a are made rough so as to form the second irregularities that are finer than the first irregularities, the light diffusing effect is enhanced, so that the unevenness of the luminance can be decreased. That is, the appropriate light condensing and diffusing effects can be provided by the first and the second irregularities, and both the enhancement of luminance and the reduction of unevenness of the luminance can be simultaneously realized. Further, since the grooves 22a are provided in the direction perpendicular to the side 21a that is an entrance face, the guiding of light in the linear direction from the light source 10 can be prevented from being obstructed. Accordingly, large quantity of light can be sent from the light source 10 to the side 21b that is located distant from the light source 10. As a result, luminance of the entire light-guide plate can be increased. Further, since two types of irregularities (the first and the second irregularities) are formed on the light-guide plate 20 itself, it becomes unnecessary to provide an optical sheet, which is a different body, used for forming the irregularities concerned.

Concerning width w of the groove 22a, for example, it is preferable that width w is set in the range 0.05 mm<w<0.2 mm. Concerning depth d of the groove 22a, for example, it is preferable that depth d is set in the range 0.002 mm<d<0.02 mm. Further, concerning pitch t of the groove 22a, for example, it is preferable that pitch t is set in the range 0.05 mm<t<0.2 mm. In this connection, in the example shown in FIG. 3(a), width w and pitch t are substantially equal to each other. On the other hand, it is preferable that the width and height of the projection P are respectively set at a value not more than ½ of width w and depth d. In general, when the width and height of the projection P on a surface are not more than 0.0001 mm, it is possible to evaluate the surface to be a substantially mirror face, and it is substantially impossible to obtain the effect of light diffusion even after the surface has been made rough.

Therefore, the width and height of the projection P are respectively set at a value higher than 0.0001 mm.

Figure 5:
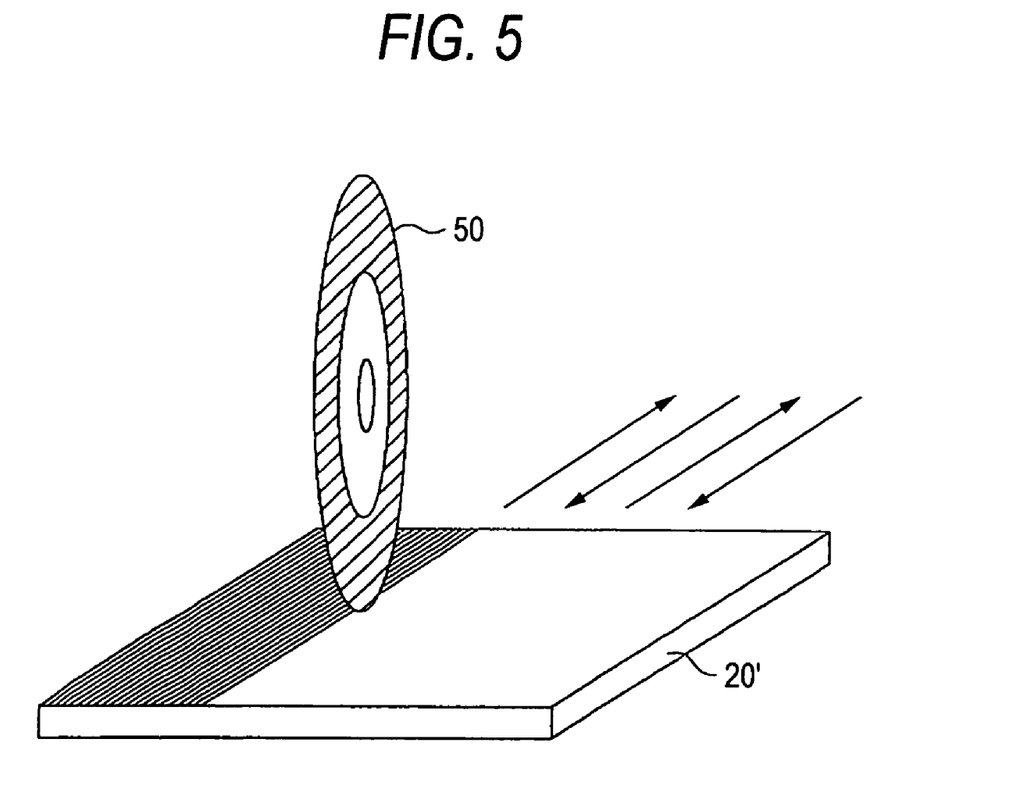
FIG. 5 is a view showing a form at the time of manufacturing the light-guide plate 20, especially at the time of forming the grooves 22a by means of grinding.

Next, a method of manufacturing the light-guide plate 20 will be explained below. Especially, a method of forming the grooves 22a will be explained below. In general, in the case of forming the grooves on the light-guide plate 20, the means of cutting is used. However, when the means of cutting is used, surfaces of the grooves are formed into a mirror face, that is, it is impossible to obtain a rough surface. Therefore, in this embodiment, the grooves 22a are formed by means of grinding. FIG. 5 is a view showing a state in which the grooves 22a are formed by means of grinding in the case of manufacturing the light-guide plate 20. As shown in the view, the grooves 22a are formed on the original substrate 20' of the light-guide plate 20 by the grinding wheel 50 which is rotated being driven. To be more specific, while the grinding wheel 50 is being contacted with the original substrate 20', the grinding wheel 50 and the original substrate 20' are relatively linearly moved in the first direction, and one groove 22a is formed. After that, the grinding wheel 50 and the original substrate 20' are relatively linearly moved in the second direction opposite to the first direction, and next groove 22a is formed. After that, when the above operation is repeated, a group of grooves 22a are formed. Due to the above grinding operation, simultaneously when the grooves 22a are formed, the surfaces of the grooves 22a are made rough according to the surface roughness of the grinding wheel 50. The width of the groove 22a is determined by the width of the grinding wheel 50, the depth of the groove 22a is determined by the cutting depth of the grinding wheel 50, the surface roughness of the groove 22a is determined by the roughness of the grinding wheel 50, and further the pitch of the groove 22a is determined by the movement of the grinding wheel 50 in the second direction. second direction.

Concerning the grinding wheel 50, for example, it is possible to use a grinding wheel 50 for cutting glass, the diameter of which is approximately 56 mm. The width of the grinding wheel 50 is determined by the width of the groove 22a. For example, the width of the grinding wheel 50 is approximately 0.4 mm. It is preferable that the grinding wheel 50 is attached with abrasive grains such as diamond powder. The surface roughness of the groove 22a is decided by these abrasive grains. It is preferable that the surface roughness of the grinding wheel 50 is, for example, #600.

Next, irregularities on the lower face 31 of the optical sheet 30 will be explained below. FIG. 2(a) is a view showing a lower face 31 of the optical sheet 30. On the lower face 31 of the optical sheet 30, a plurality of linear grooves 31a are formed in parallel with the side 21a that is an entrance face of the light-guide plate 20. Each groove 31a Is formed into a prism groove, the cross section of which is triangular. The width and pitch of the groove 31a are set larger than those of the groove 22a on the light-guide plate 20. The optical sheet 30 is provided for further facilitating the enhancement of the luminance. The reason why each groove 31a is provided in parallel with the side 21a is to condense the light in the direction Y in FIG. 2. It is preferable that the width, depth and pitch are respectively in the range 0.1 mm to 0.2 mm.

Figure 6:
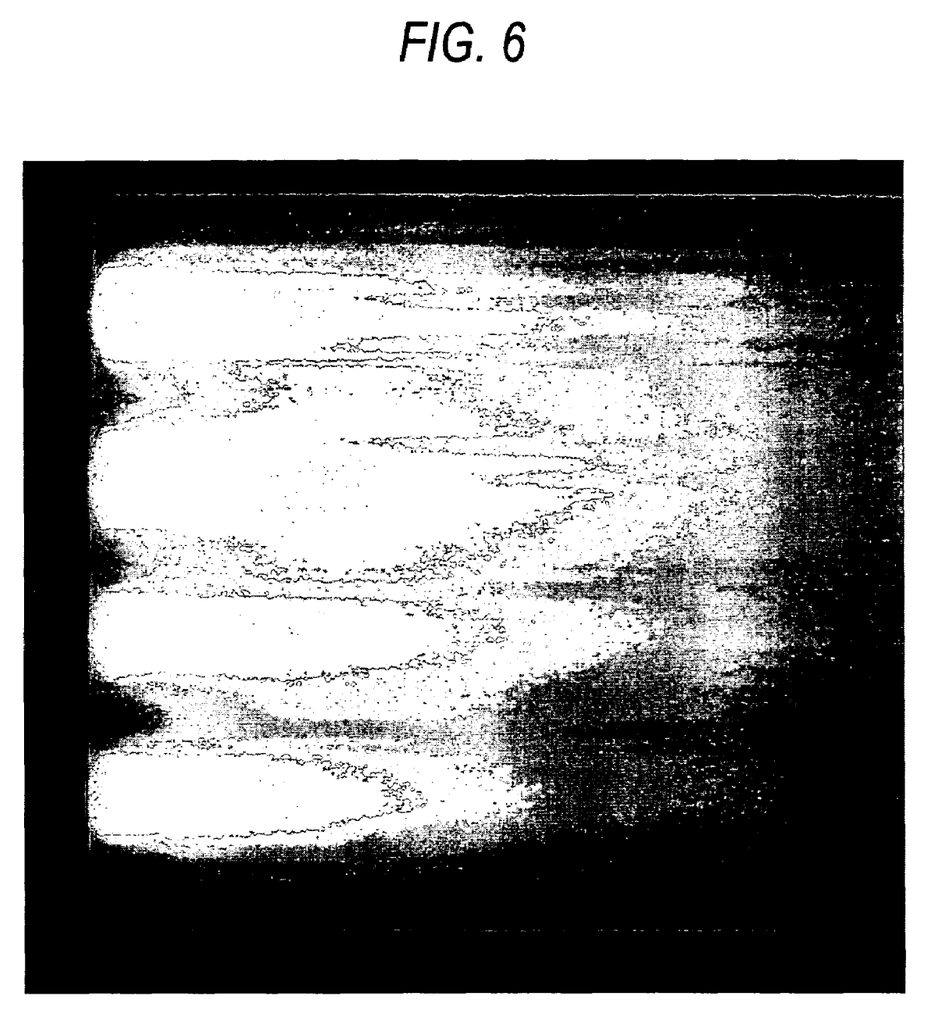
FIG. 6 is an upper face of the light-guide plate of a test product of surface light emitting device A at the time of emitting light, wherein grooves corresponding to the grooves 22a are provided, however, surfaces of the grooves are not made rough.
Figure 7:
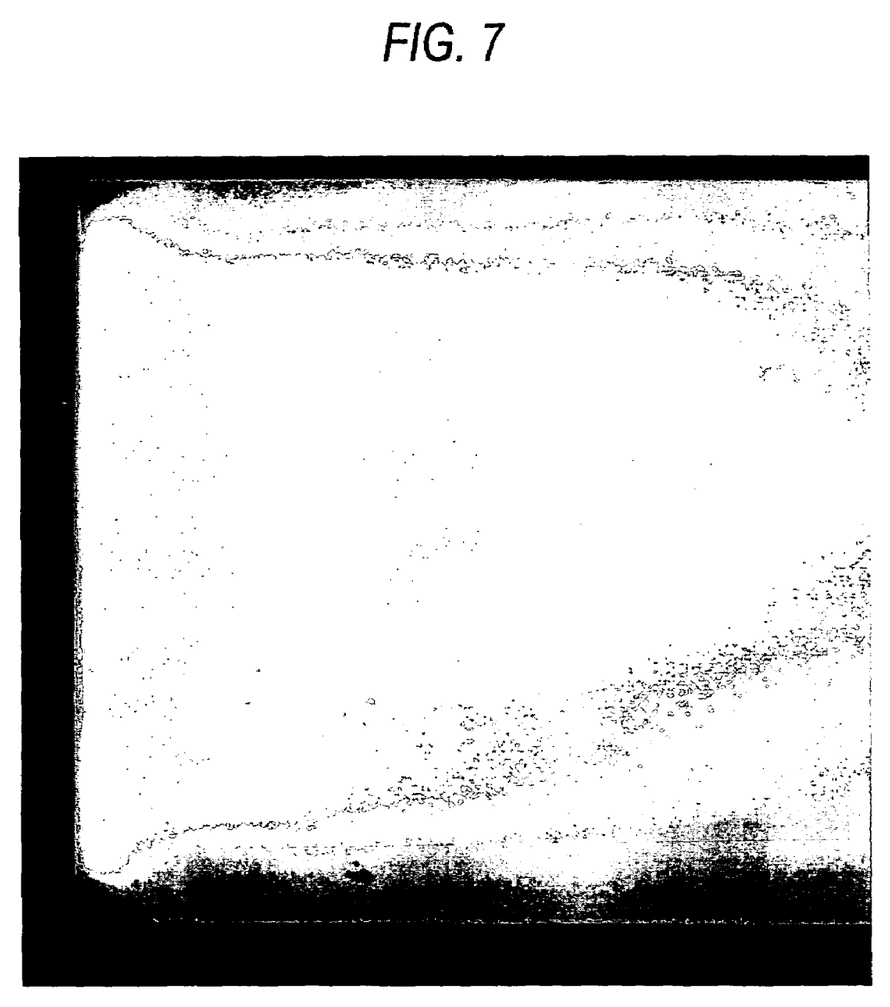
FIG. 7 is an upper face of the light-guide plate of a test product of the face light emitting device A at the time of emitting light, wherein grooves corresponding to the grooves 22a are provided, and the surfaces of the grooves are made rough.

Next, explanations will be made into a comparative example in which two cases are compared with each other. In one case, the surface of the groove 22a is made rough as shown in the present embodiment. In the other case, the surface of the groove 22a is not made rough. FIGS. 6 and 7 show an upper face of the light-guide plate of a test product of the above surface light emitting device A at the time of emitting light. In this case, four LED are arranged on the left of the light-guide plate so that they can be used as a light source. FIG. 6 shows a case In which grooves corresponding to the grooves 22a are provided, however, the surfaces of the grooves are not made rough (The grooves are formed by means of cutting. Therefore, the surfaces of the grooves can be evaluated to be a substantial mirror face.). FIG. 7 shows a case in which grooves corresponding to the grooves 22a are provided, and the surfaces of the grooves are made rough (The grooves are formed by means of grinding, and the surfaces of the grooves are the same as those of the grooves shown in FIG. 3(a)). The other conditions are the same. As can be seen on FIG. 6, unevenness of the luminance is generated, and positions of four LED, which are light sources, can be recognized. The highest luminance is obtained in the direction of 0° when It Is viewed from the light source. On the other hand, on FIG. 7, unevenness of the luminance is seldom generated, and the luminance is decreased only a little in a portion distant from the light source.

What is claimed is:

1. A light-guide plate comprising:
a light guiding body, which includes;
an entrance face into which light enters;
an emitting face from which the light emits; and
a reflection face which reflects the entered light and is opposed to the emitting face,
wherein a plurality of grooves are fanned on at least one of the emitting face and the reflection face, and are extended in a direction perpendicular to the entrance face,
wherein the grooves have rough surfaces respectively,
wherein each width of the projections is defined as w2, and
wherein each height of the projections is defined as h, such that the following equations are satisfied, $0.0001$ mm$<w2$; and $0.0001$ mm$<h$.

2. The light-guide plate according to claim 1, wherein each width of the grooves is defined as w1;
wherein each depth of the grooves is defined as d;
wherein die rough surfaces include a plurality of projections:
wherein each width of the projections is defined as w2; and
wherein each height of the projections is defined as h, such that the following equations are satisfied, $0.05$mm$<w1<0.2$mm;

$0.002$mm$<d<0.02$mm;

$w2 \leq 0.5 \times w1$;and $h \leq 0.5 \times d$.

3. The light-guide plate according to claim 1, wherein the grooves are arranged at substantially regular intervals to each other.

4. A surface light emitting device comprising:
a light source which emits light;
a light guiding body, which includes:
an entrance face into which the light enters;
an emitting face from which the light emits; and
a reflection face which reflects the entered light and is opposed to the emitting face, wherein a plurality of first grooves are formed on at least one of the emitting face and the reflection face, and are extended in a direction perpendicular to the entrance face.

wherein the plurality of first grooves have rough surfaces respectively, wherein each width of the projections is defined as w2, and wherein each height of the projections is defined as h, such that the following equations are satisfied, 0.0001mm<w2; and 0.0001mm<h.

5. The surface light emitting device according to claim 4, further comprising:
a reflection member that covers the light guiding body so as to expose the entrance face and the emitting face.

6. The surface light emitting device according to claim 4, further comprising;
an optical sheet that has translucency, and is provided on the emitting face.
wherein a plurality of second grooves are formed on the optical sheet, and are arranged in a direction parallel to the entrance face.

7. The surface light emitting device according to claim 6, wherein width and pitch of the second grooves are respectively larger than those of the first grooves.

8. The surface light emitting device according to claim 6, wherein a cross-sectional face of each of the second grooves has triangular shape.

9. A method of forming a light-guide plate, the method comprising:
providing a light guiding body; and
forming a plurality of linear grooves on at least one of faces of the light guiding body so that the grooves have rough surfaces respectively,
wherein the faces serve as an emitting face from which light emits and a reflection face which reflects the light, the reflection face being opposed to the emitting face,
wherein each width of the projections is defined as w2, and
wherein each height of the projections is defined as h, such that the following equations are satisfied, 0.0001mm<w2; and 0.0001mm<h.

10. The method of forming the light-guide plate according to claim 9, wherein the grooves are extended in a direction perpendicular to a face of the light guiding body tat serves as an entrance face into which the light enters.

11. The method of forming the light-guide plate according to claim 9, wherein the grooves are arranged at substantially regular intervals to each other.

12. The method of forming the light-guide plate according to claim 9, wherein the grooves are formed by a grinding process.

13. The method of forming the light-guide plate according to claim 12, wherein the grinding process is executed by a grindstone wheel having a rough face on a periphery thereof.

14. The method of forming the light-guide plate according to claim 13, wherein grind grains are attached to the periphery of the grindstone wheel.

15. The light-guide plate according to claim 1, wherein the randomly spaced and randomly elevated projections are formed along the grooves, and formed in a direction parallel to the direction of formation of the grooves.

16. The surface light emitting device according to claim 4, wherein the randomly spaced and randomly elevated projections are formed along the grooves, and formed in a direction parallel to the direction of formation of the grooves.

17. The method of forming the light-guide plate according to claim 9, further including;
forming the randomly spaced and randomly elevated projections along the grooves; and
forming the randomly spaced and randomly elevated projections in a direction parallel to the direction of formation of the grooves.

18. A light-guide plate comprising:
a light guiding body, which includes:
an entrance face into which light enters;
an emitting face from which the light emits; and
a reflection face which reflects the entered light, and is opposed to the emitting face, wherein a plurality of grooves are formed on at least one of the emitting face and the reflection face, and are extended in a direction perpendicular to the entrance face;
wherein the grooves have rough surfaces including a plurality of projections;
wherein each width of the projections is defined as w; and
wherein each height of the projections is defined as h, such that the following equations are satisfied.

0.0001 mm<w; and 0.0001 mm<h.

* * * * *